March 16, 1937. H. BRENDT 2,073,674
HEATER
Filed Sept. 25, 1935
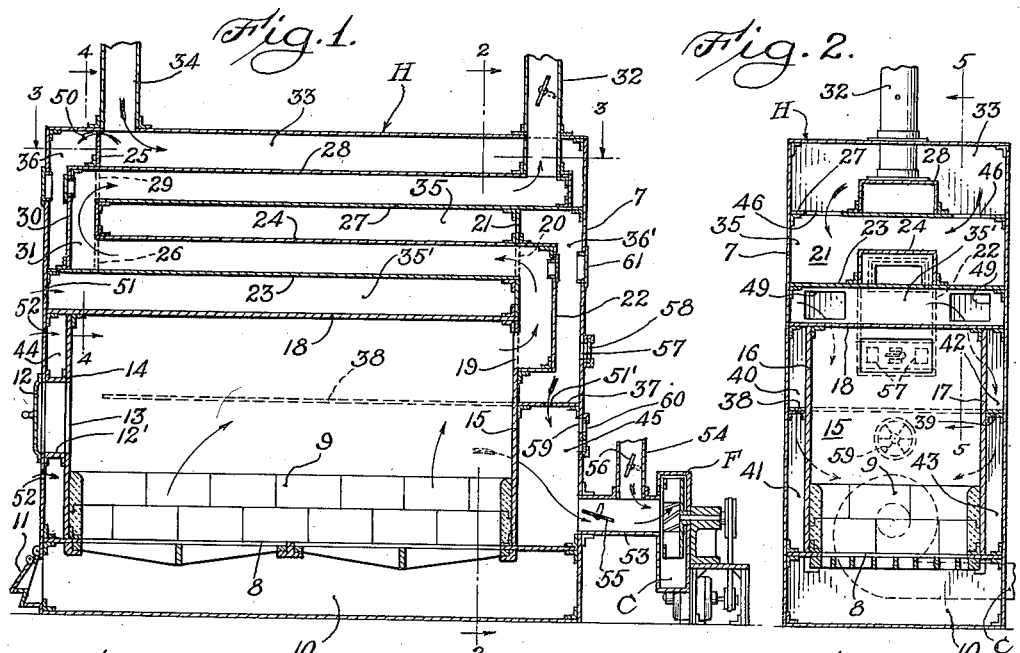
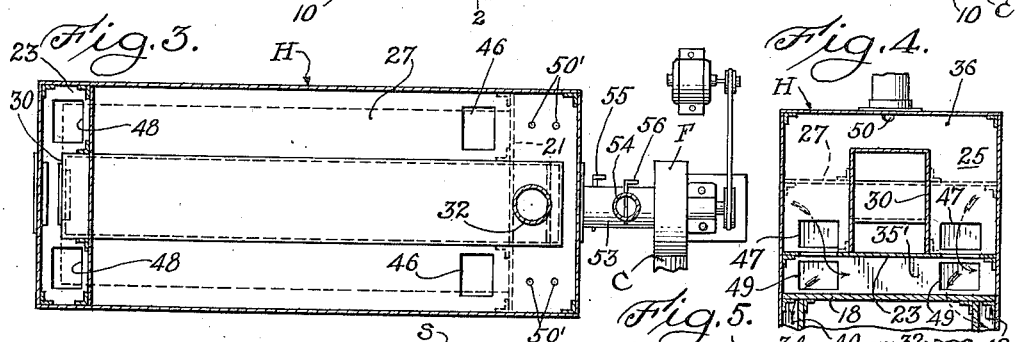
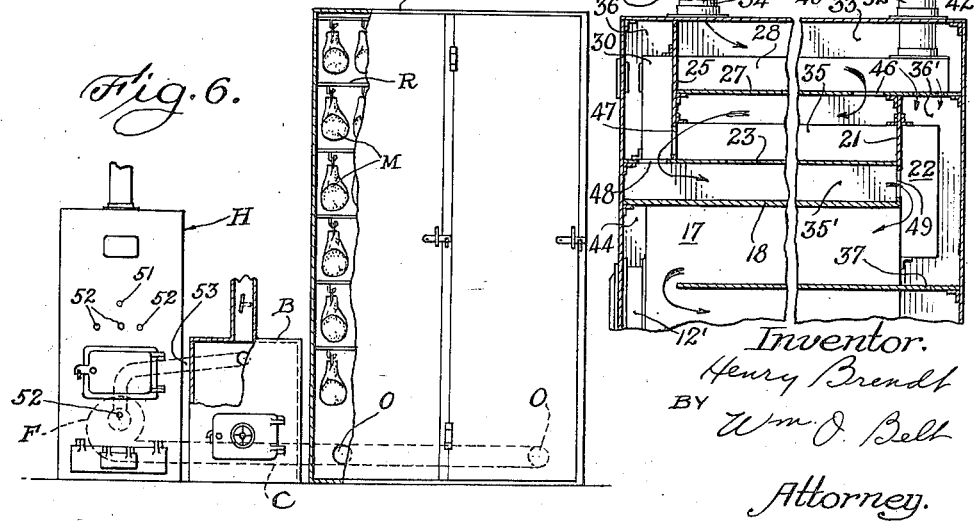
Inventor.
Henry Brendt
BY Wm. J. Belt
Attorney.

Patented Mar. 16, 1937

2,073,674

UNITED STATES PATENT OFFICE 2,073,674

HEATER

Henry Brendt, Chicago, Ill.

Application September 25, 1935, Serial No. 41,988

6 Claims. (Cl. 126—99)

This invention relates to heaters and more particularly to heaters which may among other usages be used for heating smokehouses, such as those in which meats are cured, or the like.

Meats, such as sausages, hams and bacon, are smoked for the purpose of preserving them and to improve the flavor and the like thereof. To this end such meats are hung in a smokehouse and subjected to a gradually increasing temperature to dry them, that is to say, to remove excess moisture therefrom, and then smoke is passed over the meats. The meats are usually maintained in a heated condition during smoking so as to enable smoke to permeate throughout the meat.

Heretofore the products of combustion from the source of the heat have passed over the meat during the drying and smoking thereof and, particularly when gas is employed as the heating medium, it has been found that the meats become streaked or are otherwise detrimentally affected not only as to appearance but also as to flavor and the like.

Therefore, the primary object of my invention is to provide a heater through which air may be circulated to be heated without being intermingled with the products of combustion from the source of heat in the heater whereby the heater may be advantageously employed to heat meats in a smokehouse or for other purposes where heated air including products of combustion would be disadvantageous.

Further objects are to efficiently and quickly heat air to a desired temperature, to forcibly circulate air to be heated through the heater; to so regulate the heating of the air that a desired temperature may be easily established and maintained; to mix air from the atmosphere or other source with the air circulated through the heater to temper the circulated air; and to provide a novel heater of simple and economical construction and efficient and positive operation.

A selected embodiment of my invention is illustrated in the accompanying drawing wherein—

Fig. 1 is a vertical longitudinal sectional view of an air heater embodying my invention and in which a fan used with the heater is shown in transverse section;

Fig. 2 is a vertical transverse sectional view taken substantially on the line 2—2 on Fig. 1;

Fig. 3 is a horizontal sectional view taken substantially on the line 3—3 on Fig. 1;

Fig. 4 is a fragmentary vertical transverse sectional view taken substantially on the line 4—4 on Fig. 1;

Fig. 5 is a fragmentary vertical longitudinal sectional view taken substantially on the line 5—5 on Fig. 2; and Fig. 6 is an elevational assembly view of my novel heater, a smoke-producing means, and a smokehouse and in which a part of the fronts of the smoke-producing means and the smokehouse are broken away.

In the accompanying drawing, H indicates a heater constructed in accordance with my invention and B indicates a furnace or the like in which sawdust or other material may be burned to produce smoke. Heated air from the heater H, smoke from the burner B, or both are forcibly circulated through the smokehouse S by a fan F, or other suitable air circulating means, operated, for example, by a motor. The smokehouse is equipped with racks R on which the meats M to be smoked are hung so that either heated air and smoke or both may pass thereover, the heated air and smoke being supplied to the smokehouse S through the conduit C, leading from the fan F, and being admitted into the smokehouse through inlet openings O preferably located near the bottom of the smokehouse. With the exception of the heater H the foregoing parts form no particular part of my invention except in combination with the heater. Hence, the burner B, fan F and smokehouse S may be of any desired construction suitable for the purpose without departing from the purview of my invention.

My heater comprises a shell 7 near the bottom of which there is a grate 8 preferably surrounded by fire brick 9 or the like to afford a fire pit in which coal or the like may be burned. It is to be understood that my heater may be fired by gas or oil if desired and if this is done the grate 8 will be displaced by a suitable burner. The heater as illustrated includes an ash pit 10, below the grate, and has a door 11 at one end thereof affording access thereto. A fire door opening 12, closed by a suitable door, is provided in the front wall of the shell 7 and an opening 13 is provided in the partition 14 in alignment with the door 12. A sleeve 12' extends between the openings 12 and 13 and fuel is introduced onto the grate 8 through the openings 12 and 13 and sleeve 12'.

The partition 14 is provided at the shell 7 inwardly of the front wall thereof and projects above the grate 8. Another partition 15 is provided in the shell 7 inwardly of the rear wall of the shell and likewise projects above the grate 8. As best illustrated in Fig. 2, the partition 15 does not extend entirely across the shell 7 but terminates in spaced relation therewith. Plates 16 and 17 which project above the grate extend from the side edges of this partition, in spaced relation with the side walls of the shell, to the side edges of the partition 14 which, like the partition 15, does not extend entirely across the shell. The plates and partitions are supported by the grate but in event the grate 8 is eliminated the partitions 14 and 15 and the plates 16 and 17 will be supported by suitable means provided in place of the grate 8 as will be necessary in event the heater is gas or oil fired.

A horizontally disposed plate 18 rests on the upper edges of the partitions 14 and 15 and plates 16 and 17 and extends to the front wall of the shell as well as to the side walls thereof but this plate terminates in alignment with the partition 15 so that the rear edge thereof is spaced from the rear wall of the shell. It will thus be seen that the partitions 14 and 15 and plates 17, 18 and 19 enclose the space above the grate 8 and provide what may be called a fire box, access to which is had through the door 12, sleeve 12' and opening 13.

A flue opening 19 for the fire box is provided in the upper part of the partition 15 and another flue opening 20 is provided in the partition 21 mounted on and in vertical alignment with the partition 15 but which terminates in spaced relation with the top wall of the shell 7. The partition 21 extends to the side walls of the shell. An open sided box 22 has the open side thereof rested on the partitions 15 and 21. The inner edge of the top of box 22 is aligned with the top edge of the opening 21 and the inner edge of the bottom of the box is aligned with the bottom of the opening 19. The inner edges of the sides of the box are aligned with the sides of the openings 19 and 20. Thus communication between the openings 19 and 20 is established through the box 22.

A horizontal plate 23 is mounted slightly above the horizontal plate 18 and extends between the side walls of the shell 7 and to the front wall thereof and the rear end of this plate abuts the partition 21 (Fig. 5) immediately below the lower edge of the opening 20 (Fig. 1). The open side of an elongated box 24 rests on the top of the plate 23 and the side and top walls of this box at the rear end thereof are disposed about the edges of the opening 20 on the front side of the partition 21. The front end of the box 24 engages a vertical partition 25 about the edges of an opening 26 therein. The vertical partition 25 extends between the plate 23 and the top and the sides of the shell in spaced relation with the front wall of the shell.

Another horizontal plate 27 is mounted substantially midway between the plate 23 and the top of the shell 7 and extends from the vertical partition 25 across the top of the vertical partition 21 to the rear wall of the shell 7 and also to the side walls of said shell. The open side of an elongated box 28 rests on the top of the plate 27 and the side walls at the forward end of this box abut the vertical partition 25 about the edges of an opening 29 therein but the top wall of the box extends through the opening 29 at the top edge thereof and terminates substantially midway between the front wall of the shell 7 and the vertical partition 25.

A substantially channel-shaped member 30 extends between the top of the plate 23 and the projected top wall of the box 28 and the sides thereof engage the front of the partition 25. Thus a passage 31 is enclosed through which communication is established between the openings 26 and 29. The rear end of the box 28 terminates in spaced relation with the rear wall of the shell 7 and is closed. A stack 32 extends upwardly from near the rear end of the box 28 through the top wall of the shell 7.

The opening 19, the passage enclosed by the box 22, the opening 20, the passage enclosed by the box 24, the opening 26, the passage 31, opening 29, the passage enclosed by the box 28 and the stack 32 constitute a flue for the fire box and hot products of combustion from the fire box travel through the tortuous passage thus established. This tortuous passage and the space about the fire box are utilized for heating air as will now be explained.

A chamber 33 is defined by the plate 27, the partition 25 and portions of the sides, front and rear walls and the top of the shell 7. The box 28 passes through this chamber. A stack 34, communicating with a source of fresh air, opens into the chamber 33 near the partition 25. A chamber 35 is defined by the plates 27 and 23, the partitions 21 and 25 and the sides of the shell. The box 24 passes through this chamber. A chamber 36 is defined by the partition 25 and portions of the sides and front wall and the top of the shell. The parts providing the passage 31 are arranged in this chamber. The plates 18 and 23, the partition 21 and portions of the side walls and the front of the shell define a chamber 35'. A plate 37 extends between the rear wall of the shell and the vertical partition 15 below the lower end of the cap 22 and with the rear and side walls of the shell and the plate 27 defines a chamber 36'. The box 22 is arranged in this chamber. Plates 38 and 39 are respectively disposed between the plates 16 and 17 and the adjacent side walls of the shell and are parts of the plate 37. These plates 38 and 39 terminate in spaced relation with the front wall of the shell. The plate 38 divides the space below the plate 18 and between the plate 16 and the adjacent side wall of the shell into chambers 40 and 41 that are in communication with each other near the front of the housing. The plate 39 divides the space below the plate 18 and between the plate 17 and the side of the shell into chambers 42 and 43 which are likewise in communication with each other near the front of the shell. A chamber 44 is defined between the front wall of the shell and the partition 14, and this chamber is in communication with the front ends of the chambers 40, 41, 42 and 43. Likewise an outlet chamber 45 is defined between the lower part of the partition 15 and the rear wall of the shell below the plate 37 and above a plate extending rearwardly from the grate, and this chamber is in communication with the rear ends of the chambers 41 and 43.

Fresh air admitted into the chamber 33 through the stack 44 may flow from this chamber into the chamber 35 through openings 46 in the plate 27. The air flows from the chamber 35 into the chamber 36 through openings 47 in the partition 25 and from the chamber 36 into the chamber 35' through the openings 48. Air flows from the chamber 35' into the chamber 36' through openings 49. The rear ends of the chambers 40 and 42 open into the chamber 36' and, as stated, the front ends of these chambers are respectively in communication with the front ends of the chambers 41 and 43. The rear ends of the chambers 41 and 43 are in communication with the outlet chamber 45.

Thus a circuit through which air may circulate is provided in the heater and this circuit includes stack 34, chamber 33, openings 46, chamber 35, openings 47, chamber 36, openings 48, chamber 35', openings 49, chamber 36', chambers 40 and 42, and 41 and 43, as well as chamber 44, and outlet chamber 45.

An opening 50 is provided in the upper part of the partition 25 so that fresh air passing into the chamber 33 may flow into the upper part of the chamber 36 and thereby prevent the collection of heated air at the upper part of this chamber. Openings 50' are provided in the plate 27 on opposite sides of the stack 32 to establish communication between the rear end of the chamber 33 and the top of the chamber 36'. An opening 51' is provided in the plate 37 to establish communication between the bottom of the pocket 36' and the top of the pocket 45. Moreover, additional inlets for air may be provided as, for example, an opening 51 may be provided in the front wall of the shell through which air may pass into the chamber 35' and openings such as the openings 52 may be provided in the front wall of the shell so that fresh air may pass into the chamber 44.

In the foregoing description the heater has been described as being made up of plates and partitions. Preferably these plates and partitions as well as the walls of the shell and the stacks are made of metal of such a nature that it will not deteriorate nor be detrimentally affected by heat, products of combustion and the like. Moreover, while the walls, plates and stacks are shown as being joined one to the other by the use of angle irons at the abutment of these parts one with the other, it is to be understood that other suitable means for joining may be employed and that the walls, plates, partitions and stacks may be welded, riveted, bolted or otherwise secured to the angle irons or other means as desired.

An outlet conduit 53 leads from the lower part of the outlet chamber 45 and a conduit 54 leading from the burner B opens into the conduit 53. A damper 55 is provided in the conduit 53 between the outlet chamber 45 and the inlet of conduit 54. A damper 56 is provided in the conduit 54. The conduit 53 leads to the fan F and, as explained, the conduit C leads from the fan to the smokehouse.

In operation, fuel is introduced onto the grate 8 and ignited or if gas or oil is used instead of solid fuel the burner to which one or the other of these substances is supplied is ignited. In any event the fire box is heated. It will be noted that the chambers 44, 40, 41, 42, 43, 35', 36' and 45 surround the fire box so that when the fire box becomes hot, air in these chambers will be heated both by convection and radiation, but the products of combustion from the source of heat in the fire box do not co-mingle with the air heated in these chambers. Moreover, the products of combustion pass through the flue for the fire box, previously described, and these hot products of combustion heat the box 22, box 24, channel member 30 and associated members and box 28. Heat from the box 22 heats air in the chamber 36 while heat in the box 24 heats air in the chamber 35. Likewise, heat from the passage 31 heats air in the chamber 36 and heat from the box 28 heats air in the chamber 33.

The hot products of combustion pass upwardly from the fire box to the flue 32 whereas air flowing into the air circuit, previously described, flows downwardly. Thus by the time the products of combustion reach the box 28 most of the heat will have been extracted therefrom and they will be relatively cool but nevertheless will give up some heat to the colder air freshly admitted into the chamber 33 through the stack 34. Then as the air flows down through the chambers constituting the air passage it is gradually heated up and gradually comes into contact with greater heat for the closer the products of combustion are to the fire box the more heat they will contain. This opposite flow of the heat and air very efficiently heats the air and substantially all of the heat generated in the heater is taken up by the air. Air admitted through the openings 51 and 52 near the end of the air circuit has the effect of slightly tempering the air and also preventing dead pockets wherein heated air might collect in the air passage, the openings 50, 50', and 51' also having this latter effect.

The air flows downwardly in the manner just described by reason of the action of the fan F which draws the air from the stack 34 and through the openings 51 and 52 and the air flows from the outlet chamber 45 through the conduit 53, fan F and conduit C to the smokehouse S.

Some meats require higher temperatures than others, the heat requirement usually being directly proportionate to the size of the meat but in no instance should the temperature of the air be so high that it might detrimentally affect the meat. Thus the air flowing to the meat may be tempered by the addition of fresh air in suitable quantities at various places along the circuit thereof through the heater. Thus to this end a pair of openings 57 are provided in the rear wall of the shell and open into the chamber 36'. These openings are closed by a slidable plate 58 which may be slid from closing position to permit fresh air to flow into the chamber 36'. The temperature of the air may be brought down even more effectively than by admitting air through the openings 57, by admitting air through the damper openings 59 which open into the outlet chamber 45 and which are normally closed by a damper plate 60. Fresh cool air will be admitted through these openings directly into the chamber from which the heated air is drawn from the heater, and such introduction of air will obviously have a marked cooling effect upon the heated air in the outlet chamber 45. Cleanout openings may be provided at various places in the circuit which may be closed by suitable caps 61, the purpose of which openings are well understood in the art.

A typical operation of my heater when used with a smokehouse is that air is heated in the manner described and is drawn by the fan F from the outlet chamber 45 and forced into the smokehouse which will have been previously filled with meats to be smoked. At the start of an operation the damper 56 in the pipe 54 from the burner B will be closed and the damper 55 may be regulated to determine the quantity of air drawn from the heater by the fan. Likewise, the air temperature tempering means may be adjusted so that the air will be delivered at a temperature proper for the meat in the smokehouse S. This heated air is supplied to the smokehouse for a time sufficient to properly dry the meats and when the meats are properly dried smoke and heated air are admitted into the smokehouse unless the meats are to be cold smoked, as previously explained. The burner B will, of course, be in operation generating a smoke and therefore when the damper 56 is opened smoke is admitted into the conduit 53 to be mingled with heated air flowing through this conduit. The dampers 55 and 56 are adjusted to afford the desired proportions of heated air and smoke and this supplying of heated air and smoke to the smokehouse is continued until the smoking operation is completed. If the meats are to be cold smoked, the damper 55 closes off flow through the conduit 53 from the outlet chamber 45 and therefore the fan F supplies only smoke from the pipe 54 to the smokehouse.

While I have illustrated and described a preferred form of my invention it is to be understood that this is capable of variation and modification and I therefore do not wish to be limited to the precise details set forth but desire to avail myself of such changes and alterations as fall within the purview of the following claims.

I claim:

1. In a heater an enclosed fire box, an enclosed flue leading from said fire box and through which the products of combustion from a fire in said fire box may flow, means enclosing a passage about said fire box and flue and through which air may flow to be heated by heat from the fire box and flue without intermixture with the products of combustion, and means for drawing air through said passage in a direction opposite to the flow of the products of combustion through said flue from said fire box, said means enclosing said passage having openings therein at selected positions affording intercommunication between parts of said passage to prevent pocketing of air in said parts of said passage.

2. In a heater, a shell, a plurality of plates in said shell, selected of said plates being spaced from the walls of the shell and cooperating with each other to enclose a fire box, other plates cooperating with the walls of the shell and providing an air passage, the spacing of the selected plates from the walls of the shell affording a continuation of said air passage, still other plates cooperating with each other and said other plates and providing a flue through which hot products of combustion from the fire in said fire box may flow, said flue being disposed in said air passage, means for drawing air through said passage to be heated by heat from the fire box and flue without intermixture with the products of combustion, said means communicating with the outlet end of said air passage and operating to draw air through said passage in a direction opposite to the flow of the products of combustion through said flue, said shell having at least one opening therein through which air may be admitted into said air passage to temper the air being heated therein, and means for controlling the admission of air into said passage through said opening whereby the degree of tempering of the air in said passage may be controlled.

3. In a heater, a shell, a plurality of plates in said shell and enclosing a fire box and spaced from the walls of the shell to provide an air passage about the fire box, other plates in said shell above said fire box and cooperating with each other and the walls of the shell to provide a continuation of said air passage, means providing an inlet for said air passage, other means arranged in the air passage above said fire box and providing a flue through which hot products of combustion from a fire in the fire box may flow, and means for drawing air through said passage in a direction opposite to the flow of the products of combustion from said fire box whereby the air may be heated by heat from the fire box and flue without intermixture with the products of combustion, selected ones of said other plates having openings therein affording intercommunication between parts of the air passage provided by said plates and said shell to prevent pocketing of air in said parts of said air passage.

4. In a heater, a shell, a plurality of plates in said shell and enclosing a fire box and spaced from the walls of the shell to provide an air passage about the fire box, a horizontally disposed plate in said shell above said fire box and extended to the side and front walls of said shell and spaced from the rear wall thereof, another horizontally disposed plate in said shell above the first-named horizontally disposed plate and extended to the side and rear walls of said shell and spaced from the front wall thereof, vertically disposed partitions arranged at the ends of said horizontally disposed plates and extended to the side walls of the shell and cooperating with the walls of the shell and the horizontally disposed plates to enclose chambers, said partitions and plates having openings therein through which communication is established between the chambers and the air passage about said fire box to afford a continuation of said air passage, means extended through other openings in said partitions and horizontally disposed plates and providing a flue from which hot products of combustion from a fire in said fire box may flow, means providing an inlet for said air passage at the top of the shell, means for drawing air through said passage in a direction opposite to the flow of the products of combustion from said fire box whereby the air may be heated by heat from the fire box and flue without intermixture with the products of combustion, still another horizontally disposed partition disposed between selected ones of the plurality of plates and adjacent walls of the shell and spaced from at least one wall of the shell to provide openings, the last named horizontally disposed plate dividing the air passage about the fire box into an upper chamber communicating with the lowermost of the chambers provided by the first mentioned horizontally disposed plates and a lower chamber providing an outlet chamber, the air drawing means communicating with said outlet chamber, said shell having openings therein communicating with said upper and said outlet chambers through which air may be admitted into said chambers to temper the air therein, and means for controlling the admission of air into said chambers through said openings whereby the degree of tempering of air in said chambers may be controlled.

5. In a heater, a shell, a plurality of plates in said shell and enclosing a fire box and spaced from the walls of the shell to provide an air passage about the fire box, a horizontally disposed plate in said shell above said fire box and extended to the side and front walls of said shell and spaced from the rear wall thereof, another horizontally disposed plate in said shell above the first-named horizontally disposed plate and extended to the side and rear walls of said shell and spaced from the front wall thereof, vertically disposed partitions arranged at the ends of said horizontally disposed plates and extended to the side walls of the shell and cooperating with the walls of the shell and the horizontally disposed plates to enclose chambers, said partitions and plates having openings therein through which communication is established between the chambers and the air passage about said fire box to afford a continuation of said air passage, means extended through other openings in said partitions and horizontally disposed plates and providing a flue from which hot products of combustion from a fire in said fire box may flow, means providing an inlet for said air passage at the top of the shell, and means for drawing air through said passage in a direction opposite to the flow of the products of combustion from said fire box whereby the air may be heated by heat from the fire box and flue without intermixture with the products of combustion, selected ones of said partitions and plates and the walls of said shell having openings therein through which air may pass to prevent pocketing of air in said air passage.

6. In an air heater including an enclosed fire box, an enclosed flue leading from said fire box and through which the products of combustion from a fire in said fire box may flow, means enclosing a passage about said fire box and flue and through which air may flow to be heated by heat from said fire box and flue without intermixture of the products of combustion, means for drawing air through said passage to induce a flow of air through said passage, said heater having openings therein communicating with said passage at spaced intervals and through which air may be admitted to temper the air being heated during flow thereof through said passage, and means for controlling the admission of air through said openings whereby the degree of tempering of air may be controlled and the temperature of air delivered from said heater may be regulated.

HENRY BRENDT.